(No Model.)  W. D. GRAY.  3 Sheets—Sheet 1.
FLOUR BOLT.

No. 487,004.  Patented Nov. 29, 1892.

Witnesses:
Inventor:
W. D. Gray
By his atty
Phil. T. Dodge

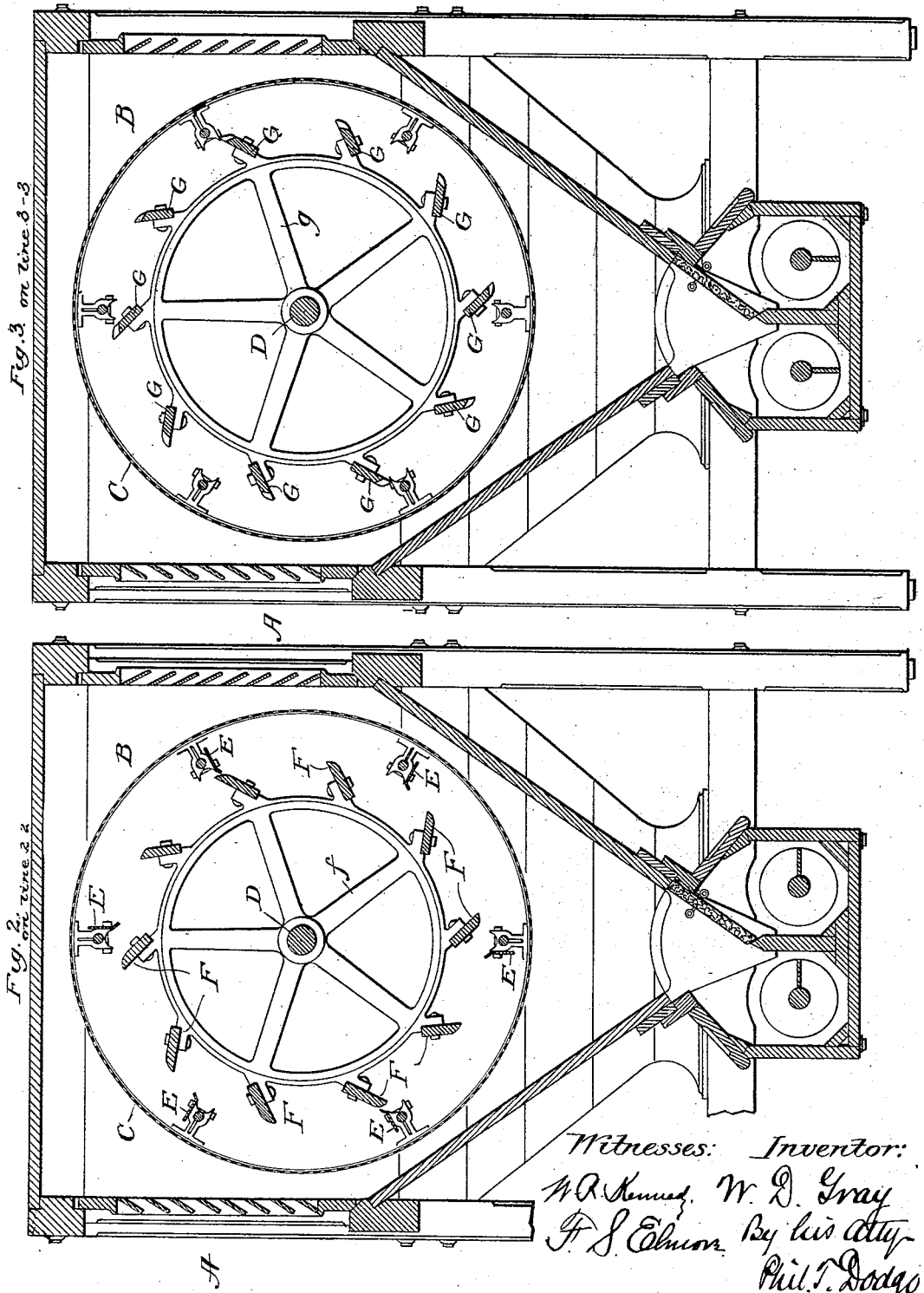

(No Model.)  3 Sheets—Sheet 3.

W. D. GRAY.
FLOUR BOLT.

No. 487,004. Patented Nov. 29, 1892.

UNITED STATES PATENT OFFICE.

WILLIAM D. GRAY, OF MILWAUKEE, WISCONSIN, ASSIGNOR TO THE EDWARD P. ALLIS COMPANY, OF WISCONSIN.

FLOUR-BOLT.

SPECIFICATION forming part of Letters Patent No. 487,004, dated November 29, 1892.

Application filed November 23, 1891. Serial No. 412,830. (No model.)

*To all whom it may concern:*

Be it known that I, WILLIAM D. GRAY, of Milwaukee, county of Milwaukee, and State of Wisconsin, have invented a new and useful Improvement in Flour-Bolts, of which the following is a specification.

This invention relates to a machine for treating ground grain or grain products to effect the separation and gradation of the fine flour and coarser materials.

Figure 1:
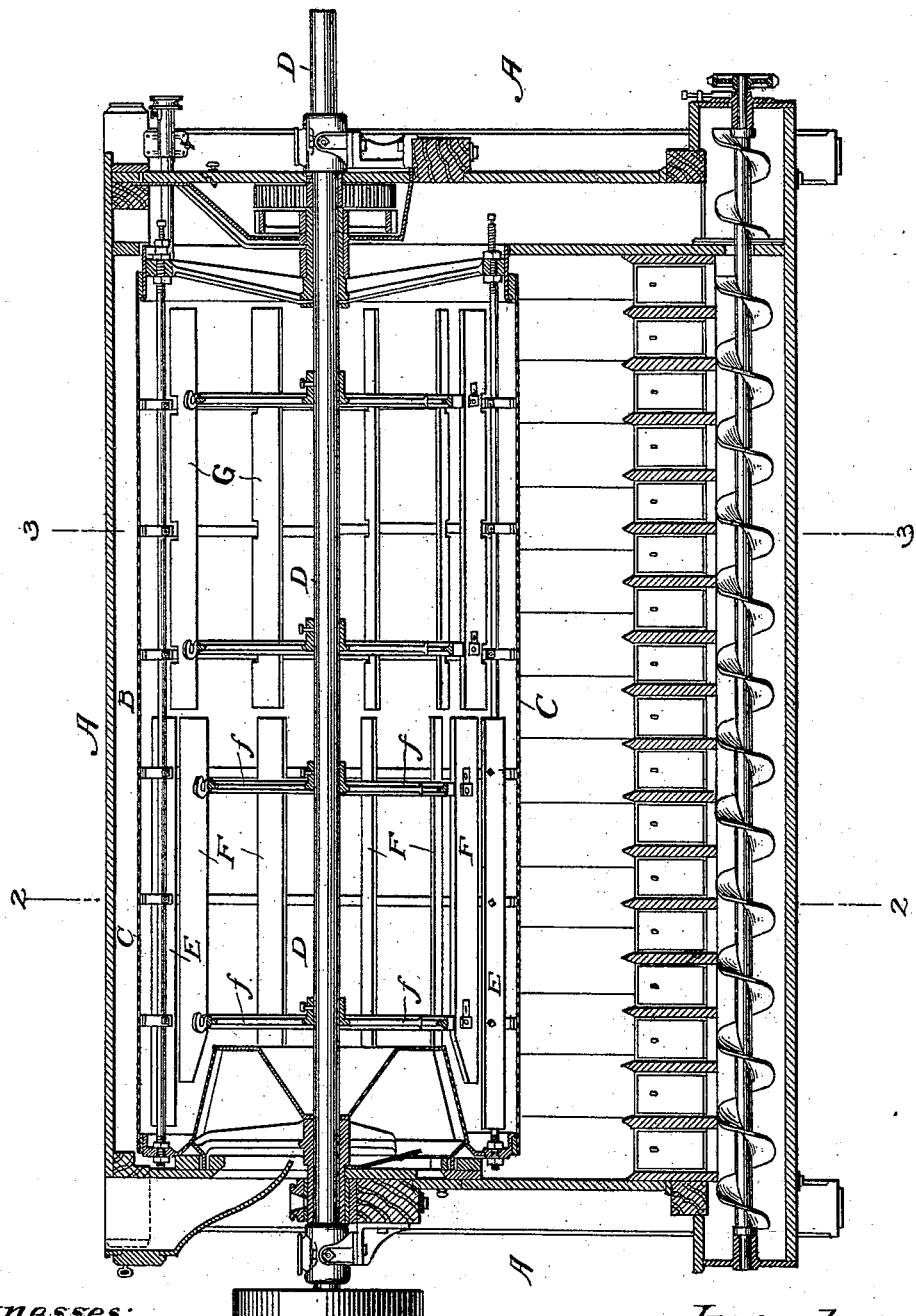
Figure 4:
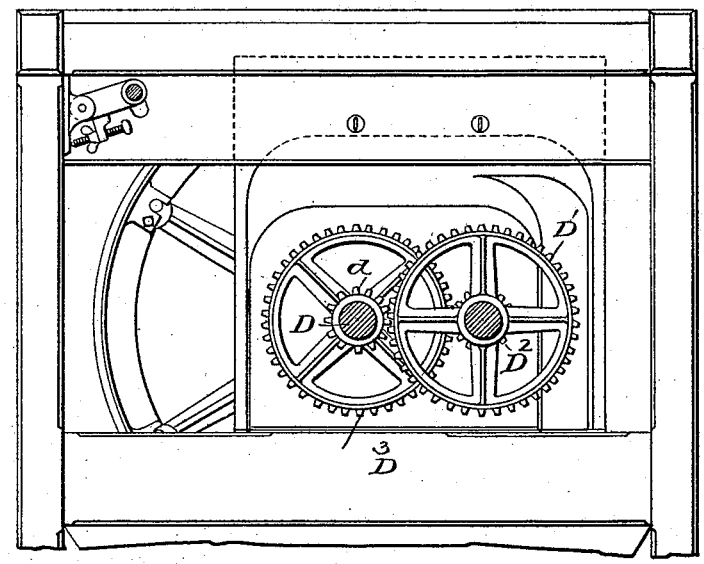
Figure 5:
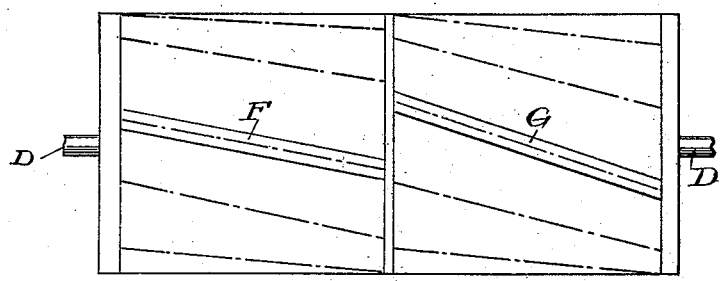

In the accompanying drawings, Figure 1 represents a longitudinal vertical section through my machine. Fig. 2 is a cross-section of the same on the line 2 2. Fig. 3 is a cross-section on the line 3 3. Fig. 4 is a detailed view of the driving-gear; Fig. 5, a diagram illustrating the longitudinal inclination of the spreader-blades.

Referring again to the drawings, A represents a rectangular external frame or casing the details of which may be modified at will, provided only it is adapted to sustain and inclose the operative parts.

B is a reel the frame of which may be of any suitable construction, clothed externally with bolting-cloth C or equivalent pervious material, which presents a continuous cylindrical surface and which may be graded in fineness from the head to the tail, according to the nature of the material treated, as is usually practiced in the art. The reel is sustained by its end spiders mounted to turn loosely around the shaft D, arranged in a slightly-inclined position and seated in bearings in the main frame. For one-half its length, or thereabout, the reel is provided at the head end with a series of longitudinal internal lifting buckets or blades E, which may be of any suitable form in cross-section and sustained therein in any suitable manner, provided only that their outer edges are slightly separated from the bolting-cloth, so that they will act on the upgoing side of the reel to lift the material under treatment above the point to which it would otherwise rise and permit it to flow or slide gently backward past their outer edges and downward over the ascending surface of the cloth, in order to increase the bolting action on the upgoing side, as in machines heretofore patented to me. Within the head end of the reel and inside of the lifting-buckets E, I arrange a series of longitudinal spreader or beater blades F, carried by spiders $f$, fixed on the rapidly-driven shaft D, these blades being adapted to receive such portions of the material as are carried to the upper part of the reel by lifting-buckets E and throw the same upward and outward against the bolting-cloth at the top and on the downgoing side of the reel. The parts are so proportioned and driven that these revolving spreader-blades act with a gentle spreading or "sowing" action to deliver the material against the cloth without undue violence, while their action is principally to deliver the material against the top and downgoing portions of the cloth, and they also act to some extent to spread the same over the remaining portions. In the tail portion of the reel, beyond the ends of the elevators E and spreaders F, I mount a second series of longitudinal spreader-blades G, carried by spiders $g$, fixed on the shaft D. These blades G are set outward nearer the bolting-cloth than the blades F, and they serve to take up the material which has already been treated and partly separate it by the head portion of the reel and spread the same outward against the tail portion of the cloth in order that it may be further treated thereby.

In practice I find that by thus combining in one machine with the bolting-cloth the lifting-buckets and spreader-blades to give the material a preliminary treatment and secondary spreader-blades acting to deliver the material thus treated a second time to a bolting-cloth I am enabled to effect a very satisfactory separation, and to give the machine a very great capacity in proportion to its size.

In practice the spreader-blades should be revolved at a higher speed than the reel. Good results are obtained by driving a reel of thirty-two inches diameter at about twenty revolutions per minute, while the spreader-blades are driven at two hundred revolutions.

Many mechanisms suitable for imparting differential motions are known to every skilled mechanic; but I recommend the arrangement represented in Figs. 1 and 4 of the drawings, in which the rapidly-revolving shaft D carries a pinion $d$, engaging the gear D′, mounted on a fixed stud and carrying on its side a pinion D², which in turn engages a gear D³ on the tail-spider of the reel, whereby a slow motion is imparted from the shaft to the reel. This arrangement of gearing is not in itself claimed as of the present invention.

It is to be understood that the framing of the reel, the shape of the elevator-blades and buckets, and the devices for supporting the same may be modified at will within the limits of mechanical skill, provided the mode of operation essentially such as herein described is retained. The best results are obtained when the blades F are arranged in a slightly-inclined or spiral position to assist in the working of the material endwise through the reel, the secondary spreader-blades G giving the best results when arranged with a spiral pitch or inclination greater than that of the blades F, as shown in the diagram in Fig. 5.

While I have described and illustrated a reel of true cylindrical form, it is to be understood that reels of slightly-tapered or conical form to facilitate the delivery of the material endwise without inclining the axis will fall within the scope of my invention, conical and cylindrical reels being well-known equivalents in the present state of the art.

The reel may be provided with a uniform bolting-cloth from end to end or with cloth graded in fineness from one end to the other, as commonly practiced in the art, according to the character of the material to be treated and the extent to which it is to be separated or graded. While the best results are obtained by rotating the spreader-blades in the same direction as the reel, but at a higher speed, it will be manifest that the blades, suitably inclined, may be revolved in the opposite direction to throw the material elevated by the lifting blades or buckets against the cloth at the top and on the downgoing side.

I do not claim, broadly, herein the combination of an external reel, lifting-buckets, and an internal rotary spreader, as this combination, as embodied in the head portion of the present machine, forms the subject-matter of a separate application filed by me of even date herewith, Serial No. 412,828.

Having thus described my invention, what I claim is—

1. The combination, substantially as shown, of the reel, lifting-buckets in its head end only, rotary spreader-blades inside of said buckets, rotary spreaders in the tail end of the reel, and mechanism for revolving the spreaders and the reel at different speeds.

2. The combination, substantially as shown, of the reel, the lifting-buckets in its head end, rotary spreaders inside of said buckets, rotary spreaders located in the tail with a longitudinal inclination greater than that of the head-spreaders, and mechanism for rotating the reel and spreaders at different speeds.

3. In a flour-bolt, the combination of a rotary encircling bolting-cloth, internal lifting-buckets to spread the material on the upgoing side, central rapidly-revolving spreaders to receive the material from the lifters and deliver it against the cloth, bolting-cloth to which the material passes after the above treatment, and a second series of rotary spreaders encircled thereby and acting without intervening parts to deliver the material to the cloth.

4. A continuous cylindrical bolting-reel, in combination with two series of rapidly-rotating spreader-blades located within the reel, those at the tail end being located nearer the bolting-surface than those at the head end.

In testimony whereof I hereunto set my hand, this 7th day of November, 1891, in the presence of two attesting witnesses.

WILLIAM D. GRAY.

Witnesses:
WM. BANNEN,
FRANK W. GREENLEAF.